Oct. 30, 1956     L. G. REED     2,768,466

FISH LURE

Filed Oct. 29, 1954

*INVENTOR.*
LEON G. REED
BY

*McMorrow, Berman + Davidson*
ATTORNEYS.

United States Patent Office 2,768,466
Patented Oct. 30, 1956

2,768,466

FISH LURE

Leon G. Reed, Olathe, Kans.

Application October 29, 1954, Serial No. 465,469

2 Claims. (Cl. 43—42.39)

This invention relates to fish lures. More particularly, the invention has reference to a lure of the deep running, weedless type.

An important object of the present invention is to provide a lure which is so designed as to periodically rotate either partially or through a full cycle about its longitudinal axis, to simulate a small minnow or other fish.

Another object is to provide in such a lure a propeller or spinner of improved shape, adapted to turn intermittently and at comparatively slow speed while the lure is being retrieved.

Another object is to provide in such a lure a body portion of a shape that is particularly adapted to facilitate intermittent rotation of the lure about its longitudinal axis, said body portion being formed with one end axially twisted 90 degrees relative to its other end.

Other objects will appear from the following description, the claims appended thereto, and from the annexed drawing, in which like reference characters designate like parts throughout the several views, and wherein:

The illustrated fishing lure embodying the present invention comprises a non-buoyant head 10 formed from a solid piece of lead or other heavy material, thus to impart a deep running characteristic to the lure while the same is being drawn through the water. The head 10, as shown, is of circular cross section for the major part of its length, the head tapering gradually from a location adjacent its rear end 13 thereof to its front end 11. From said location to the rear end of the head, the head is formed with flat, rearwardly convergent, approximately triangular flat side surfaces 12 terminating at their convergent ends in closely spaced relation. The rear end of the head, between the convergent ends of the side surfaces 12 of the head, is substantially flat and lies in a plane normal to the length of the head.

Figure 1:
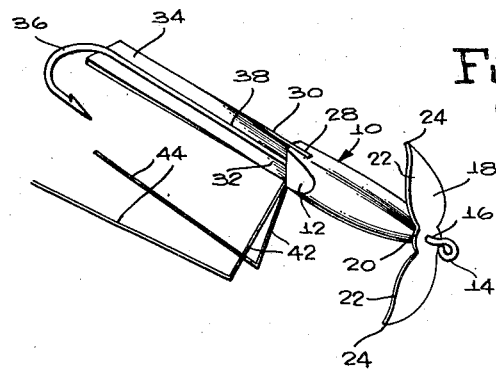
Figure 1 is a perspective view of a fish lure embodying the present invention.
Figure 4:
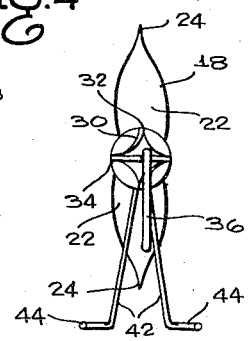
Figure 4 is an end elevation view of the lure as seen from the left of Figure 2.
Figure 2:
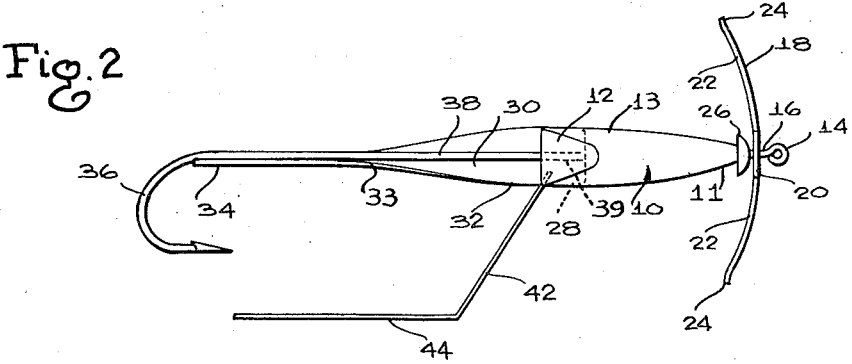
Figure 2 is a side elevational view.
Figure 3:
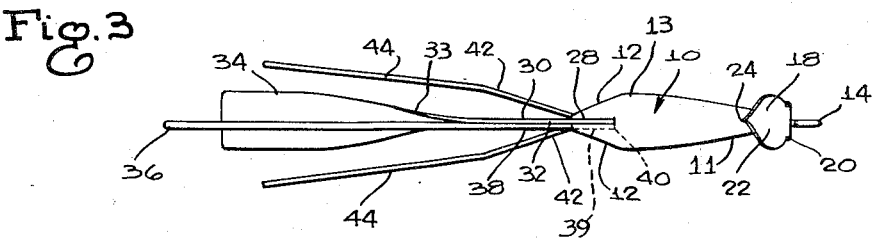
Figure 3 is a top plan view.

Secured in and projecting forwardly from the front, tapered end of head 10 is a line-receiving eye 14 integral with a short, straight shank 16 disposed axially of the head. A propeller 18 is formed from a thin strip of metal material, having a uniform curvature from end to end thereof as shown in Figure 2, so that the opposite ends of the propeller are disposed rearwardly of the center portion thereof. The propeller 18 is formed with a circular center portion 20 having an aperture loosely receiving the shank 16 to permit free rotation of the propeller. Blades 22, formed upon diametrically opposite portions of the center portion 20, terminate at their outer ends in pointed tips 24. The blades 22 are approximately elliptical in outer configuration, and the tips 24 are bent slightly forwardly out of the common arc of blades 22 as shown in Figure 2.

Between the propeller 18 and the adjacent end of head 10 there is interposed a circular, convex concave washer 26 loosely receiving and freely rotatable upon the shank 16.

Formed in the rear end of head 10 is a slot 28 located medially between the convergent side surfaces 12, said slot extending in a plane disposed diametrically of the head, and the slot opens through the top and bottom surfaces of the head.

Embedded fixedly in slot 28 is the front end of a body portion 30 formed from a single elongated rectangular strip of thin metal material. The strip 30 is axially twisted as at 33 through 90 degrees medially between its ends to form a front end portion 32 lying in a plane normal to the plane of the rear end portion 34 of the body portion.

A hook 36 has a curved, barbed trailing end portion projecting beyond the trailing end of the end portion 34 of body portion 30. The hook has a straight shank 38 extending in closely spaced parallel relation to the axis of the lure, said shank at its front end 39 being embedded in a socket 40 in the rear end of the head 10 communicating with slot 28. The shank of the hook, throughout its length, is fixedly secured to the body portion, 30.

Weed guards 42 are provided on the lure, said weed guards being formed from small gauge wire and including inner end portions embedded in the rear end of body 10 and angled rearwardly and laterally away from the body. Said inner end portions of the weed guard are inclined downwardly in a direction away from the body, and at their divergent ends are integral with elongated outer end portions 44 which also diverge rearwardly away from the body. The outer end portions of the weed guards are disposed at an obtuse angle to the inner end portions thereof, and lie in a plane paralleling the axis of the body.

In use, the lure is retrieved at a slow speed. During its movement, it has a deep running, smooth action, the propeller turning, due to its particular shape, with sufficient irregularity to simulate closely the fin movement of a small fish. The weighting of the lure at the head end thereof causes it to tilt downwardly at said end, and said downward tilting, during the forward movement of the lure, so disposes the propeller as to add to the faithfulness of the fin simulation, causing an intermittent rotation of the same. During movement of the lure through the water, the entire lure will rotate about its longitudinal axis, either partially or through a full cycle, due to the axial twisting of the body portion 30.

Generally, the lure tends to run with the bight of the hook 36 upwardly relative to the weed guards 42, 44, thus reducing to a minimum the possibility of its snagging upon weeds or other obstructions.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a fish lure, a weighted non-buoyant head having a front end and a rear end, line attaching means on said front end, a flat elongated strip having a front end and a rear end, said strip being twisted between its ends on its longitudinal axis and providing flat forward and rearward portions, means fixing the front end of the strip to the rear end of said head with the strip in axial alignment with the head, and a hook having a shank extending along and secured to one side of the strip and having a bight extending beyond the rear end of the strip, said hook shank having a front end and said rear end of the head having a socket in which the front end of the shank is secured.

2. In a fish lure, a weighted non-buoyant head having a front end and a rear end, line attaching means on said front end, a flat elongated strip having a front end and a rear end, said strip being twisted between its ends on its longitudinal axis and providing flat forward and rearward portions, means fixing the front end of the strip to the rear end of said head with the strip in axial alignment with the head, and a hook having a shank extending along and secured to one side of the strip and having a bight extending beyond the rear end of the strip, said hook shank having a front end and said rear end of the head having a socket in which the front end of the shank is secured, and a pair of weed guards having forward ends secured to the rear end of said head, said weed guards extending rearwardly and laterally away from the head.

References Cited in the file of this patent

UNITED STATES PATENTS

| | | |
|---|---|---|
| 804,206 | Burton | Nov. 14, 1905 |
| 824,739 | Phelps | July 3, 1906 |
| 1,303,467 | Ettershank | May 13, 1919 |
| 1,450,798 | Filipowski | Apr. 3, 1923 |
| 1,459,042 | Wrege | June 19, 1923 |
| 1,516,940 | Winchell | Nov. 25, 1924 |
| 2,167,335 | Hayes | July 25, 1939 |
| 2,333,590 | Schueller | Nov. 2, 1943 |

FOREIGN PATENTS

| | | |
|---|---|---|
| 220,683 | Switzerland | Aug. 17, 1942 |